US006077029A

United States Patent [19]

Johnson

[11] Patent Number: 6,077,029

[45] Date of Patent: Jun. 20, 2000

[54] APPLIANCE SUPPORT

[76] Inventor: James D. Johnson, 25893 Fogham Ave., Callao, Mo. 63534

[21] Appl. No.: 09/087,443

[22] Filed: May 29, 1998

Related U.S. Application Data

[60] Provisional application No. 60/080,532, Apr. 3, 1998.

[51] Int. Cl.[7] .......... B23Q 3/00

[52] U.S. Cl. .......... 414/778; 280/47.12

[58] Field of Search .......... 280/47.12; 414/754, 414/778

[56] References Cited

U.S. PATENT DOCUMENTS

| | | | |
|---|---|---|---|
| 1,185,615 | 6/1916 | Beaumont et al. | 280/47.12 |
| 1,534,346 | 4/1925 | White | 280/47.12 |
| 2,300,165 | 4/1942 | Mustafa | 280/47.12 |
| 3,022,995 | 2/1962 | Sorenson et al. | 414/778 |
| 3,702,660 | 11/1972 | Berger | 414/778 |
| 4,674,731 | 6/1987 | Stellato | 269/79 |
| 4,901,989 | 2/1990 | Stellato | 269/17 |

*Primary Examiner*—Gregory A. Morse
*Attorney, Agent, or Firm*—Mark Manley

[57] ABSTRACT

An aid for use in repairing large appliances. The appliance support slips under a large appliance such as a washing machine and allows the service technician to tilt the appliance forward or sideways to an easier position to work on. The support has two angled working positions one at about 45 degrees tilt and a second at about 90 degrees of tilt of the appliance. This allows a technician to remove parts such as the back off a washing machine without bending down into an uncomfortable position. Flipping the appliance support over it can serve as a step stool.

9 Claims, 3 Drawing Sheets

APPLIANCE SUPPORT

This application claims benefit of Provisional Appl. No. 60/080,532, filed Apr. 3, 1998.

BACKGROUND OF THE INVENTION (1) Field of the Invention

The present invention relates to an appliance support for use by service technicians in assembly or repair work on appliances.

(2) Description of the Prior Art

U.S. Pat. No. 4,674,731 (June 1987) to Stellato proposed a device to tilt the appliance forward, however the device attached to the back of the appliance where the technician was trying to work. The device wound up getting in the way as discussed in Stellato's second U.S. Pat. No. 4,901,989 (February 1990). This device was unnecessarily complicated and did not provide for multiple servicing positions. To be used by service people the appliance support must be simple, effective and light weight.

As will be seen from the subsequent description of the embodiments of the present invention, the shortcomings of the prior art are overcome.

SUMMARY OF THE INVENTION

Appliance service technicians repair large appliances in a variety of places as this service work is typically done where the appliance is used. Typically the service person is called into someone's home or apartment for example, and must repair the appliance without removing it from the home. Many appliances are positioned against a wall in the home and are frequently positioned in such a way that the work requires moving the appliance. For example, in servicing a typical dryer the repair person would need to pull the dryer out from the wall. Usually it can only be moved about 2 feet from the wall and then the repair person must climb over the appliance and try to work in the small space created. Most appliances have a back that must be removed and the screws to the back are right at floor level so the service person gets into an impossibly cramped position and often comes away from the job with a sore back.

The present invention provides an appliance repair support. The support makes it easier for the repair technician to do repair work on large appliances by allowing the appliance to be repositioned.

The device provides for two appliance servicing positions. The first is to tilt the appliance to a 45 degree angle. The second is to tilt the appliance to a 90 degree angle relative to the starting position. This tilting of the appliance allows the repair person easier access to bolts and components that are often located on the under side of the appliance. For example, for stability the heavy motor or compressor of an appliance is typically located in the base of the appliance. This forces the repair person to stoup down in an unnatural position to work. The appliance support allows the appliance to be repositioned to a more ergonomically correct angle and position to service an appliance motor.

The support allows the repair person to store the appliance on the support. Thus if the repairman has the appliance up on the support in the shop he can leave it there until, for example, some ordered parts come in. Alternatively, if the support is needed then the repair person can quickly remove the appliance.

The support is light weight and compact. This is absolutely essential if the technician is going to take the device into customer's homes. The device has mar resistant surfaces where it contacts the floor and the appliance.

The device is simple to use and the basic device has no moving parts. The device is very stable in use and requires no straps, no adjustments or clamping devices. Alternatively the device can have wheels to help move an appliance.

The device lifts the appliance up as it is tilted so that when the appliance has been tilted through 90 degrees it is also lifted off the floor about one foot.

The device also provides a small stepping stool for working up high on an appliance such as a refrigerator.

DESCRIPTION OF THE PREFERRED EMBODIMENTS

Figure 1:
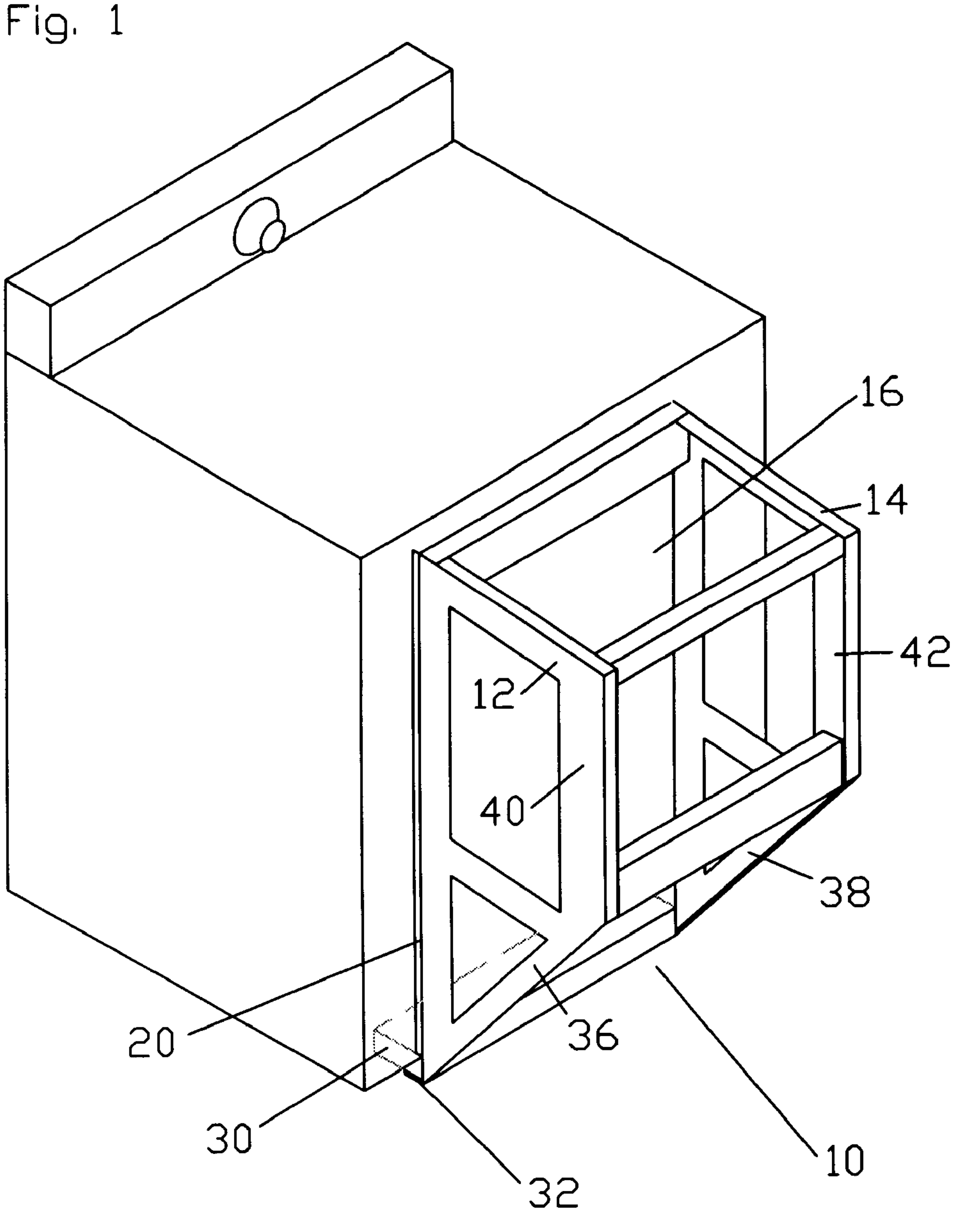
FIG. 1 shows the appliance support in a first position with the appliance ready to lift a dryer
Figure 2:
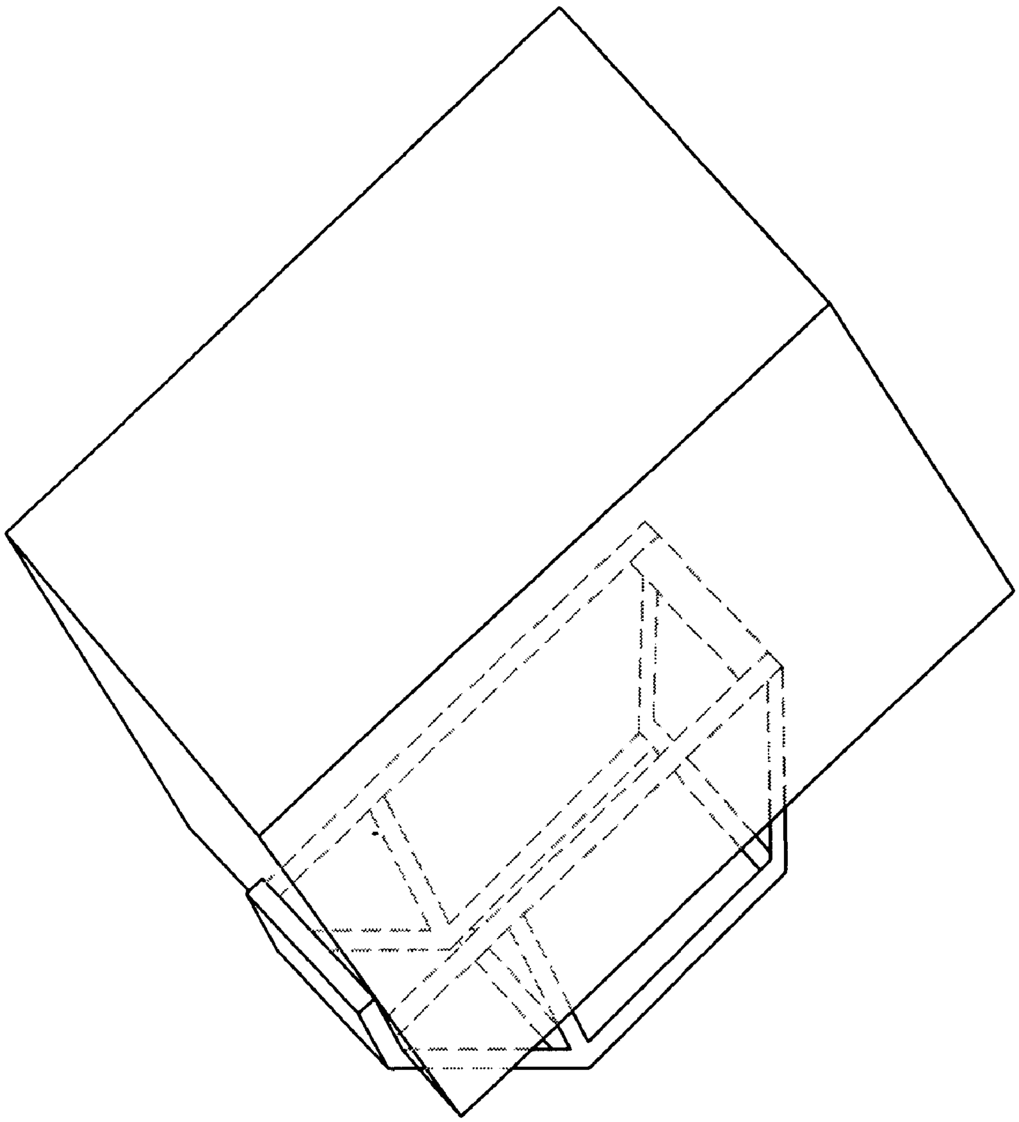
FIG. 2 shows the support tilted to a second position with a refrigerator in place

Referring to FIG. 1, a dryer (unnumbered) is shown ready to be lifted by the appliance support (10). The support (10) has two sides (12) and (14) spaced by cross members (16). Each side includes plate surface face (20) that is padded and that engages the face of the appliance. At one end of the support is a plate shaped toe (30) that fits under lower frame of the appliance and that engages the appliance with its upper surface during tilting. The plate shaped toe (30) has a small raiser area (32) on its lower ground engaging surface on the edge away from the appliance. This raiser area tends to force the appliance support in tight engagement against the face of the appliance. The plate shaped toe (30) and plate surface face (20) come together near this same edge Each side (12) and (14) has a second surface (36) and (38). As can best be seen in FIG. 2, when the appliance and support are tilted forward by the workman the second surfaces come into engagement with the ground. This establishes the second stable position for the appliance and support.

Figure 3:
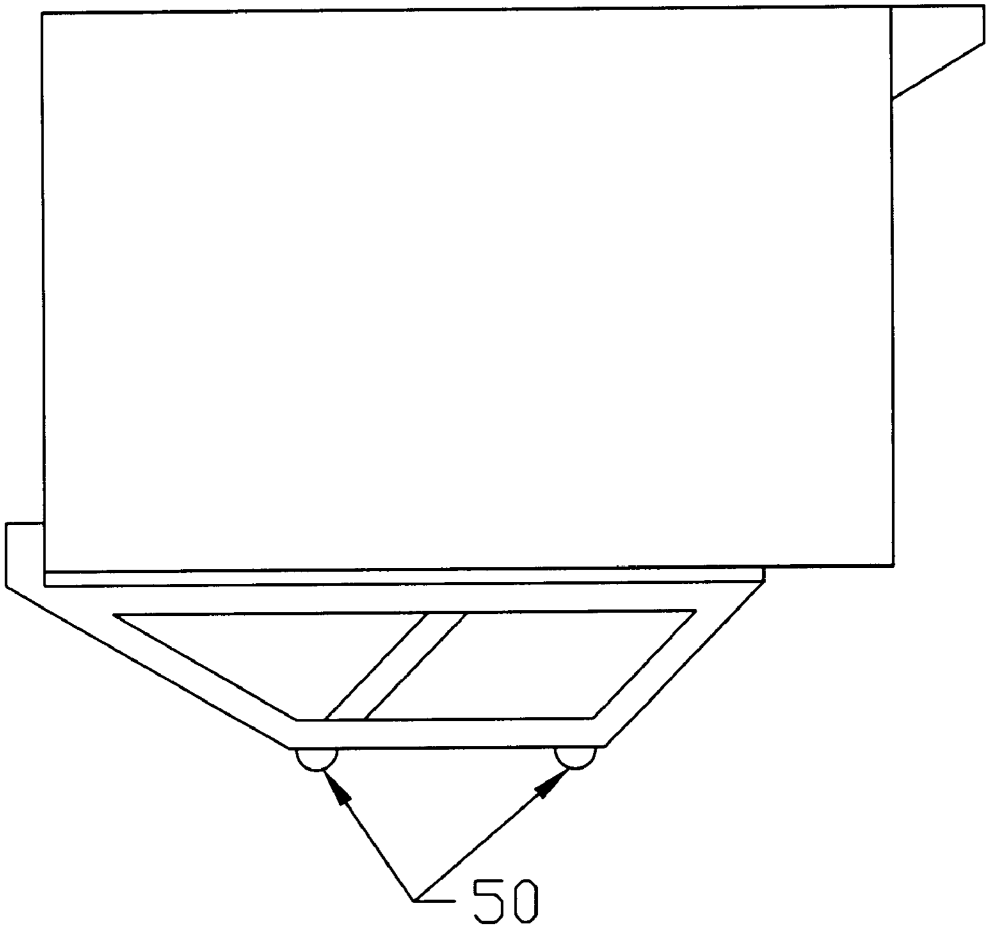
FIG. 3 shows a second embodiment with wheels and shows the lift in its third position with a dryer in place.

Each side (12) and (14) has a third surface (40) and (42). As can best be seen in FIG. 3, the appliance and support can be tilted forward to a third stable position where the third surfaces are in contact with the ground. The embodiment of FIG. 3 shows wheels added to aid in moving the appliance around.

In operation the repair person would go to a customer site to work on an appliance. The technician would tilt the appliance back a little to get the toe (30) of the support under the appliance and then let the weight of the appliance down on the toe (30). The raiser area (32) will force the surfaces (20) into tight engagement with the front face of the appliance. At this point the technician can grab the appliance near its back and pull it forward. The appliance support will remain tightly engaged against the face of the appliance so that the technician does not have to worry about the support moving away from the appliance. The raised area (32) will provide a pivot point and keep the appliance from slipping forward. The technician could get behind the appliance and push the appliance onto the appliance support but this is usually only possible in the appliance shop as most home owners do not leave space behind an appliance to stand. As the appliance tilts forward the technician lowers it into a tilted position where the second surfaces (36,38) engage the floor. In this second position the appliance and support are again stable, considerable effort is required to knock the appliance off the support. Note that as the appliance is tilted forward it also moves horizontally towards the appliance support and away from the wall. Once the appliance is tilted to this second position some space is created between the home wall and the appliance so that the technician can get behind the appliance. This second position where the appliance is at a 45 degree angle and somewhat raised off the floor is very ergonomic for removing the back off the appliance. Most appliance backs have many tiny screws around the edges and it is very hard on the back of the technician to remove these without the appliance support. With the back off, the technician can then look inside the appliance and verify any suspected problems. A major advantage of the appliance support is that it lifts the appliance as it tilts the appliance.

The appliance may need to be tilted further forward to the third position. Again the technician grabs the appliance and tilts it into that position where surfaces (40) and (42) engage the floor. The appliance is again stable in this position. The third position provides easy access to the underneath side of the appliance. In this position, as can be seen in FIG. 3, the appliance is lifted off the ground. With most appliances a lift of about one foot has been found to work nicely.

As repair of the appliance proceeds the technician might tilt the appliance back and forth between the positions to get access to the various components to be repaired or replaced. The appliance can be stored on the support while the technician is waiting for parts. Then, when the work is done the appliance is again tilted upright to its normal position and the appliance support is removed.

The device could have additional stable positions where the appliance could be tilted to. For example the device could have faces that would allow for a 30 degree tilt in addition to the 45 and 90 degree positions. As currently designed the device is ideal for servicing appliances such as washing machines, dryers, refrigerators and dishwashers. By flipping the support over so that the surfaces (20) are on the floor the device can be used for a short stepping stool such as might be needed to reach the top hinge on a refrigerator.

Although the description above contains many specifics, these should not be construed as limiting the scope of the invention but merely providing illustration of some of the preferred embodiments. For example, although the device is shown as it might be built from sheet metal components, the device could also be molded from plastic. It would also be possible to replace the fixed supports (16) with adjustable side supports that would allow the device to fold up flat.

What is claimed is:

1. An appliance service support comprising;

a plate having a first ground engaging surface and an upper surface, said plate being sufficiently thin to fit under the lower frame of an appliance;

said first ground engaging surface on said plate having an edge;

a second plate connected to said first plate at said edge and perpendicular to the first plate said second plate having a face;

a riser connected to the first ground engaging surface near said edge such that when said lower surface is placed under an appliance, said riser is between said edge and the ground such the weight of said appliance urges said face on said second plate is into engagement with a face of said appliance.

2. The appliance service support of claim 1 wherein there is a second ground engaging surface;

and including a first stable position where said first ground engaging surface of said plate is approximately parallel with the ground surface;

and a second stable position where said first ground engaging surface is generally at 45 degrees to the ground and said second ground engaging surface rests on said ground surface.

3. The appliance support of claim 2 wherein there is a third ground engaging surface; and including a third stable position where said first ground engaging surface is approximately perpendicular to said ground surface and wherein said third ground engaging surface rests on the ground surface.

4. An appliance service support comprising;

a plate having a first ground engaging surface and an upper surface, said plate being sufficiently thin to fit under the lower frame of an appliance such that tilting the appliance support will cause the appliance to tilt;

said first ground engaging surface on said plate having an edge;

a second plate connected to said first plate at said edge and perpendicular to the first plate, said second plate having a face;

a first stable position of said appliance service support wherein said first ground engaging surface rests on a ground surface and wherein a riser located on said ground engaging surface at said edge tilts the support toward the appliance, urging said face of said second plate into engagement with the appliance;

a second stable position of said appliance service support wherein said first ground engaging surface is generally at a 45 degree angle with the ground surface.

5. The appliance service support of claim 4 further comprising;

a third stable position of said appliance service support wherein said first ground engaging surface is generally perpendicular to the ground surface.

6. An appliance service support for supporting an appliance in part by engaging a face of said appliance, said support comprising;

first means to maintain an appliance in a first stable position;

riser means using the weight of said appliance to urge a face of said appliance service support into engagement with the face of said appliance when said appliance is in said first stable position;

second means to allow tilt of said appliance to a second stable position and maintain said appliance in said second stable position wherein said second stable position is at a 45 degree angle relative to said first stable position;

third means to tilt said appliance to a third stable position and maintain said appliance in said third stable position wherein said third stable position is at a 90 degree angle about a horizontal axis from said first stable position.

7. The appliance support of claim 6 wherein said appliance in said second stable position is displaced in a vertical direction from said first stable position.

8. The appliance support of claim 7 wherein the appliance in the third stable position is displaced further in said vertical direction from said first stable position.

9. An appliance service support for supporting an appliance by engaging a face on the appliance, the support comprising;

a first appliance engaging plate, said first plate being thin enough to slip under said appliance, a top surface of said first plate designed to contact the under side of said appliance, a bottom surface on said first plate designed to contact the ground when said top surface is contacting the bottom of said appliance, a second plate, generally perpendicular to the first plate having a first surface to contact a face of said appliance, a riser on an edge of said bottom surface of said first plate, said riser positioned to tip said first and second plates such that said first surface of said second plate is tilted into tight engagement with said appliance front face.

* * * * *